United States Patent [19]

Zollman

[11] 4,062,827

[45] Dec. 13, 1977

[54] COLORED CYANOACRYLATE ADHESIVE COMPOSITIONS

[75] Inventor: Herbert T. Zollman, Kingsport, Tenn.

[73] Assignee: Eastman Kodak Company, Rochester, N.Y.

[21] Appl. No.: 735,653

[22] Filed: Oct. 26, 1976

[51] Int. Cl.$^2$ .............................................. C08K 5/04
[52] U.S. Cl. .............................. 260/42.21; 260/42.52
[58] Field of Search ....................................... 260/42.21

[56] References Cited

U.S. PATENT DOCUMENTS

| | | | |
|---|---|---|---|
| 2,784,215 | 3/1957 | Joyner | 260/465.4 |
| 3,699,076 | 10/1972 | Thomsen et al. | 260/42.21 |

*Primary Examiner*—James H. Derrington
*Attorney, Agent, or Firm*—Elliott Stern; Daniel B. Reece, III

[57] ABSTRACT

Autopolymerizable α-cyanoacrylate adhesive compositions having incorporated therein up to about 5% of a dyestuff selected from 1-hydroxy-3-bromo-4-amino anthraquinone (red), 2-(3-hydroxy-2-quinolinyl)-1H-indene-1,3(2H)-dione (yellow) and 12H-phthaloperin-12-one (orange).

7 Claims, No Drawings

COLORED CYANOACRYLATE ADHESIVE COMPOSITIONS

This invention relates to new autopolymerizable α-cyanoacrylate adhesive compositions. More specifically this invention relates to autopolymerizable α-cyanoacrylate adhesive compositions which are readily visible to the human eye when the compositions are spread in thin films. The difficulty involved in the coloring of cyanoacrylate adhesives is well known. See U.S. Pat. No. 3,699,076. Accordingly, I have discovered a stable adhesive composition which is autopolymerizable when spread in thin films comprising a monomeric α-cyanoacrylate ester of the formula:

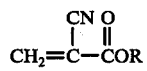

wherein R is alkyl of 1 to 16 carbon atoms, alkenyl of 2 to 6 carbon atoms, alkoxyalkyl of 1 to 16 carbon atoms, cyclohexyl or phenyl; said composition containing up to about 5% by weight of a dye selected from 1-hydroxy-3-bromo-4-amino anthraquinone (red), 2-(3-hydroxy-2-quinolinyl)-1H-indene-1,3(2H)-dione (yellow), and 12H-phthaloperin-12-one (orange). In a preferred embodiment of this invention the cyanoacrylate adhesive utilized is selected from the group consisting of methyl α-cyanoacrylate, ethyl α-cyanoacrylate and butyl α-cyanoacrylate. Examples of other cyanoacrylate adhesives which can be utilized in the practice of this invention are allyl α-cyanoacrylate, methoxymethyl α-cyanoacrylate, cyclohexyl α-cyanoacrylate, propyl α-cyanoacrylate and the like. Preferably, the amount of dye utilized will be in the range of from 0.1 to about 4% by weight based upon the total weight of the composition.

The cyanoacrylate monomers can be prepared in any desired manner. A particularly suitable process for the preparation of these monomers is described in U.S. in Pat. No. 3,254,111. Any of the cyanoacrylate monomers defined herein can be used alone or in mixtures of two or more such monomers.

Polymeric thickeners such as poly-α-cyanoacrylates, cellulose acetates, cellulose nitrates, cellulose butyrates, cellulose propionates, polymethacrylates and other polymeric materials which are know to be soluble in the monomeric α-cyanoacrylates can be employed as viscosity regulators.

Polymerization inhibitors such as sulphur dioxide, boron trifluoride, hydrogen fluoride, nitric oxide phosphorous, pentoxide, antimony pentoxide, picric acid, hydroquinone and the like can also be used in the compositions of this invention.

Additionally, plasticizers such as, for example, dioctyl phthalate, butyl cyanoacetate, dimethyl succinate, dimethyl sebacate and dioctyl adipate can be used if desired to impart desired characteristics to the adhesive bond.

The coloring compounds comprising a part of the adhesives of this invention are characterized by being sufficiently soluble in the α-cyanoacrylate monomers to impart color thereto which is readily visible to the human eye. The coloring material is further characterized in that it is sufficiently non-basic so as to not initiate polymerization of the monomer. The colored adhesive compositions of this invention are further characterized in having bulk liquid storage stability sufficient to withstand a temperature of at least 75° F. for at least 1 month. These materials can be obtained commercially or may be prepared in a manner well known in the art.

The following examples further illustrate the invention.

EXAMPLE 1

Twenty-eight grams (1 ounce) of methyl α-cyanoacrylate modified with a thickening agent were placed in three 1-ounce polyethylene bottles. 0.01 Grams of each type of dye were added to the three bottles of adhesive and shaken until all of the dye dissolved. The adhesive remained stable for over 1 month at 75° F. The shear strength of the adhesive with and without the dyes is given in the following table.

| Steel-Steel Bonds After 24 Hours at 75° F. Average Shear Strength, psi, 3 Specimens/Test | |
|---|---|
| | psi |
| Methyl α-Cyanoacrylate (without dye) | 3340 |
| Methyl α-Cyanoacrylate (with 0.01 grams 12H-phthaloperin-12-one) | 3090 |
| Methyl α-Cyanoacrylate (with 0.01 grams 1-hydroxy-3-bromo-4-amino anthraquinone) | 2310 |
| Methyl α-Cyanoacrylate (with 0.01 grams 2-(3-hydroxy-2-quinolinyl)-1H-indene-1,3(2H)-dione) | 2840 |

EXAMPLE 2

Twenty-eight grams (1 ounce) of ethyl α-cyanoacrylate were placed in three 1-ounce polyethylene bottles. 0.01 Grams of each type of dye were added to the three bottles of adhesive and shaken until all of the dye dissolved. The adhesive has remained stable for over 1 month at 75° F. The shear strength of the adhesive with and without the dyes is given in the following table.

| Steel-Steel Bonds After 24 Hours at 75° F. Average Shear Strength, psi, 3 Speciments/Test | |
|---|---|
| | psi |
| Ethyl α-Cyanoacrylate (without dye) | 2240 |
| Ethyl α-Cyanoacrylate (with 0.01 grams Orange perinone dye) | 1910 |
| Ethyl α-Cyanoacrylate (with 0.01 grams Red anthraquinone dye) | 1450 |
| Ethyl α-Cyanoacrylate (with 0.01 grams Yellow quinoline dye) | 1590 |

The invention has been described in detail with particular reference to preferred embodiments thereof, but it will be understood that variations and modifications can be effected within the spirit and scope of the invention.

I claim:

1. A stable adhesive composition which is autopolymerizable when spread in thin films comprising a monomeric α-cyanoacrylate ester of the formula:

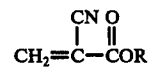

wherein R is alkyl of 1 to 16 carbon atoms, alkenyl of 2 to 6 carbon atoms, alkoxyalkyl of 1 to 16 carbon atoms, cyclohexyl or phenyl; said compositions containing from 0.1 to about 5% by weight of a dye selected from 2-(3-hydroxy-2-quinolinyl) -1H-indene-1,3(2H)-dione and 12H-phthaloperin-12-one.

2. The composition of claim 1 wherein the α-cyanoacrylate is methyl α-cyanoacrylate.

3. The composition of claim 1 wherein the α-cyanoacrylate is ethyl α-cyanoacrylate.

4. The adhesive composition of claim 2 wherein the coloring material is 2-(3-hydroxy-2-quinolinyl)-1H-indene-1,3-(2H)-dione.

5. The adhesive of claim 3 wherein the coloring material is 2-(3-hydroxy-2-quinolinyl)-1H-indene-1,3-(2H)-dione.

6. The adhesive of claim 2 wherein the coloring material is 12H-phthaloperin-12-one.

7. The adhesive of claim 3 wherein the coloring material is 12H-phthaloperin-12-one.

* * * * *